United States Patent
Subramanian

(10) Patent No.: US 12,384,340 B2
(45) Date of Patent: Aug. 12, 2025

(54) EMERGENCY BRAKING OF A VEHICLE USING COMPOUND PARKING AND SERVICE BRAKING

(71) Applicant: Volvo Truck Corporation, Gothenburg (SE)

(72) Inventor: Chidambaram Subramanian, Greensboro, NC (US)

(73) Assignee: Volvo Truck Corporation, Gothenburg (SE)

( * ) Notice: Subject to any disclaimer, the term of this patent is extended or adjusted under 35 U.S.C. 154(b) by 190 days.

(21) Appl. No.: 18/303,669

(22) Filed: Apr. 20, 2023

(65) Prior Publication Data
US 2023/0347854 A1 Nov. 2, 2023

Related U.S. Application Data

(60) Provisional application No. 63/335,277, filed on Apr. 27, 2022.

(30) Foreign Application Priority Data

May 6, 2022 (EP) ...................................... 22172059

(51) Int. Cl.
*B60T 8/32* (2006.01)

(52) U.S. Cl.
CPC .............. *B60T 8/327* (2013.01); *B60T 8/323* (2013.01); *B60T 8/328* (2013.01); *B60Y 2200/142* (2013.01)

(58) Field of Classification Search
CPC .......... B60T 8/327; B60T 8/323; B60T 8/328; B60T 13/662; B60T 17/22; B60T 8/1708;
(Continued)

(56) References Cited

U.S. PATENT DOCUMENTS 10,272,890 B2 * 4/2019 Carritte ...................... B60T 8/38
10,576,946 B2 * 3/2020 Gomes ..................... B60T 17/22
(Continued)

FOREIGN PATENT DOCUMENTS

DE 10338565 A1 3/2005
EP 2055541 A1 5/2009
(Continued)

OTHER PUBLICATIONS

Extended European Search Report for European Patent Application No. 22172059.2, mailed Nov. 7, 2022, 8 pages.

*Primary Examiner* — Kurt Philip Liethen
(74) *Attorney, Agent, or Firm* — Withrow & Terranova, PLLC

(57) ABSTRACT

A method of brake management in a heavy vehicle is provided, and includes, in response to determining that a request for emergency braking is imminent, increasing an air pressure of e.g., a service brake system of the vehicle and decreasing an air pressure of e.g., a parking brake system of the vehicle. The method further includes, in response to actually receiving the request for emergency braking of the vehicle, performing an emergency braking of the vehicle by compounding both the service and parking brake systems, including further increasing the air pressure of the service brake system and further decreasing the air pressure of the parking brake system. A corresponding brake system controller, brake system, heavy vehicle, computer program and computer program product are also provided.

11 Claims, 3 Drawing Sheets

(58) Field of Classification Search
CPC .......... B60T 8/171; B60T 8/172; B60T 13/66; B60Y 2200/142
See application file for complete search history.

(56) References Cited

U.S. PATENT DOCUMENTS

| | | | |
|---|---|---|---|
| 10,676,073 B2* | 6/2020 | Gomes | B60T 17/22 |
| 2012/0312645 A1* | 12/2012 | Frashure | B60T 8/243 |
| | | | 701/70 |
| 2016/0368466 A1* | 12/2016 | Odate | B60T 7/042 |
| 2018/0354475 A1* | 12/2018 | Carritte | B60T 8/38 |
| 2021/0197805 A1* | 7/2021 | Robbel | G06V 10/764 |

FOREIGN PATENT DOCUMENTS

| | | | |
|---|---|---|---|
| EP | 2708428 A1 | 3/2014 | |
| EP | 3415386 A1 | 12/2018 | |

\* cited by examiner

EMERGENCY BRAKING OF A VEHICLE USING COMPOUND PARKING AND SERVICE BRAKING

RELATED APPLICATIONS

The present application claims priority to European Patent Application No. 22172059.2, filed on May 6, 2022, and entitled "EMERGENCY BRAKING OF A VEHICLE USING COMPOUND PARKING AND SERVICE BRAKING," which claims the benefit of priority under 35 U.S.C. § 119(e) of U.S. Provisional Application No. 63/335,277, filed on Apr. 27, 2022, entitled "EMERGENCY BRAKING OF A VEHICLE USING COMPOUND PARKING AND SERVICE BRAKING," the disclosures of both of which are incorporated herein by reference in their entireties.

TECHNICAL FIELD

The present disclosure relates to the field of braking of (heavy) vehicles. In particular, the present disclosure relates to braking of vehicles in emergency situations.

BACKGROUND

In heavy vehicles (such as for example trucks) in particular, the brakes normally responsible for reducing a speed of the vehicle while driving are often pneumatically operated. These brakes are activated when e.g., the driver presses on the brake pedal within the cabin of the vehicle, and the brakes use compressed air to generate brake force e.g., by pushing a brake shoe against a brake drum (in case of drum brakes) and/or by pushing a brake pad against a brake rotor (in case of disc brakes). By increasing the air pressure in the brake system, more brake force is thus generated. One example of such brake systems is e.g., so-called service brakes.

Due to various resistance/friction forces inherent to the brake system itself, the applied air pressure needs to exceed a certain pressure threshold before any brake force is actually applied on the wheels of the vehicle. After the driver first presses on the brake pedal, there is therefore a delay until the brakes start to generate brake force, as sufficient air pressure to overcome the above resistance/friction forces must first be built up in the brake system.

In an emergency situation, wherein being able to quickly reduce the speed of the vehicle is imperative, such a delay caused by the resistance/friction forces of the brake system may cause an increased stopping (or braking) distance of the vehicle, and thereby increases a risk of an accident occurring.

SUMMARY

To at least partially alleviate the above-identified issues with emergency braking of a (heavy) vehicle, the present disclosure provides an improved method of brake management in a vehicle, a brake system controller, a brake system for a vehicle, a heavy vehicle, and a computer program and computer program product as defined in the accompanying independent claims. Various alternative embodiments of the improved method, controller, brake system, heavy vehicle, and computer program and computer program product are defined in the accompanying dependent claims.

According to a first aspect of the present disclosure, a method of brake management in a heavy vehicle is provided (where the vehicle is e.g., a heavy commercial/utility vehicle). It is assumed that the vehicle has both a pneumatic first brake system as well as a pneumatic second brake system. The first brake system is configured to start generating brake force when an air pressure of the first brake system goes above (i.e., exceeds) a first pressure threshold, while the second brake system is configured to start generating brake force when an air pressure of the second brake system (instead) goes/falls below a second pressure threshold. The method includes, i) in response to determining that a request for emergency braking of the vehicle is imminent, i-a) increasing the air pressure of the first brake system, such that an additional air-pressure increase needed before the first brake system starts to generate brake force is smaller than before such increasing, and i-b) decreasing the air pressure of the second brake system, such that an additional air-pressure decrease needed before the second brake system starts to generate brake force is smaller than before such decreasing. The method also includes, ii) in response to (actually) receiving the request for emergency braking of the vehicle, performing an emergency braking of the vehicle by compounding both the first brake system and the second brake system, including: ii-a) further increasing the air pressure of the first brake system to above the first pressure threshold, and ii-b) further decreasing the air pressure of the second brake system to below the second pressure threshold.

The present disclosure and the proposed method improve upon currently available solutions in that the air pressure of the first brake system is increased not only when a request for emergency braking arrives, but already at an earlier stage when it is assumed that such a request will soon arrive (i.e., is imminent). By so proactively doing, the additional air-pressure increase that is needed for the first brake system to start generating brake force is reduced, and the first brake system may therefore more quickly start to provide brake force when the request for emergency braking of the vehicle arrives, and the stopping distance of the vehicle may consequently be reduced. In addition, the proposed solution also uses that a (heavy) vehicle is often equipped with an additional (second) brake system which, contrary to e.g., service brakes, is instead configured to start generating brake force when its air pressure goes below (instead of exceeds) a particular pressure threshold. One example of such additional brake systems is e.g., that of parking brakes, which are usually configured such that they are inactive only when sufficiently pressurized, and such that they, as a safety measure, become active and start to generate brake force should the air pressure drop sufficiently low. For example, a parking brake system may use one or more coil springs to provide braking force when the coil springs are released, and wherein, for braking force generation to stop, the coil springs must first be compressed using pressurized air.

In particular, the present disclosure is based on the realization that it is often quicker to release air from a system than to provide air to the system. By utilizing that a heavy vehicle often includes one or more brake systems which are activated by air pressure-release instead of air pressure-buildup, the proposed method thus further improves upon currently available solutions in that it uses such pressure decrease-activated brake systems to more quickly generate at least some brake force before the pressure increase-activated brake systems are sufficiently pressurized to become fully activated. Consequently, in the proposed solution of the present disclosure, the delay between e.g., pressing the brake pedal and any brake force being generated is thus further reduced by using the additional (second) brake system (such as the parking brake system). Although the brake force generated by e.g., the parking brake system is most likely much smaller than the brake force eventually generated by e.g., the service brake system, the proposed solution provides at least some brake force also during the beginning of the emergency braking of the vehicle, and thus help s to reduce the stopping distance of the vehicle in such an emergency situation even further. Even with only a small further reduction of the stopping distance, such a further reduction may still be the difference between avoiding an accident and not, and the overall safety of the vehicle (and of its surrounding environment) is thus further enhanced.

As used herein, it is envisaged that determining that a request for emergency braking is imminent may be implemented using already available solutions, such as various technologies already envisaged for e.g., self-driving vehicles or similar, and/or various technologies already envisaged for driver safety enhancement or similar. For example, it is envisaged to use e.g., camera and/or LIDAR systems to identify potential dangers ahead of the vehicle (such as other vehicles, persons, animals, or similar), and to based thereon determine whether the vehicle is likely to hit such objects if the speed of the vehicle is not quickly reduced. Likewise, it is envisaged to also, or instead, use e.g., steering wheel sensors, pedal sensors, or similar, to detect how the driver reacts, and to based thereon determine whether the driver's reaction is likely caused by an imminent need for emergency braking or not. More elaborate systems may include using e.g., one or more cameras to detect a facial expression of the driver, an eye gaze pattern of the driver, a hand grip of the user when holding the steering wheel, how the driver moves a foot from the throttle pedal to the brake pedal, or to perform any other suitable analysis of input from such sensors and/or cameras. If it is predicted/determined that a need for emergency braking of the vehicle is imminent, one or more signals may be produced which indicate such an imminent need. It is for example envisaged that a machine learning algorithm (implementing e.g., an artificial neural network, ANN) may be trained to detect if e.g., the current actions (as indicated by the sensors and/or cameras) are such that the driver is about to trigger/request an emergency braking of the vehicle, or similar. As used herein, that it is determined that the request for emergency braking is imminent may mean that it is determined that a probability (i.e., a likelihood) of such a request arriving anytime soon is sufficiently high (e.g., above a certain probability threshold).

As used herein, a request for (i.e., a triggering of) emergency braking is envisaged as occurring when (or if) it is finally decided that the vehicle must quickly be brought to a halt, or at least where it is decided that the vehicle's speed must quickly be reduced somehow. This may be indicated e.g., by (detecting that) the driver (is) pressing on the brake pedal, and in particular by (detecting that) the driver (is) pressing heavily on the brake pedal. In other embodiments, the request for emergency braking can be generated by the vehicle itself, after e.g., detecting that the response of the driver is (likely) not sufficient to avoid e.g., a collision or similar. The vehicle may then itself request for the emergency braking, e.g., by generating a signal to e.g., a brake controller used to control the braking systems of the vehicle.

Importantly, it should be noted that the present disclosure thus makes a distinction between an emergency braking request being imminent and an emergency braking being actually requested. That the emergency braking request is imminent means that it is somehow considered/determined/predicted that the current actions of the driver (and/or of the behavior of the vehicle itself) are such that the driver (and/or vehicle) will likely soon be requesting an emergency braking of the vehicle. The request for emergency braking arrives later, and includes an explicit request to start emergency braking of the vehicle.

In some embodiments of the method, the method may further include, iii) after performing step ii) (i.e., after having begun the emergency braking of the vehicle), increasing the air pressure of the second brake system to above the second pressure threshold again. By reducing the brake force generated by the second brake system by increasing its air pressure again, further wear and/or damage of the second brake system (and/or of the first brake system) may thus be avoided, in particularly as e.g. a parking brake system may be designed to operate mainly when the vehicle is not moving at all, or when moving only with low speed, and as a long-term compounding of multiple brake systems may generate forces which exceed those permitted for the individual brake system components. In some embodiments, this may include increasing the air pressure of the second brake system until e.g., the parking brakes disengage and the second brake system no longer generates any brake force. For example, there may be a predefined value to which the air pressure of the second brake system is increased in this situation, where the predefined value corresponds to e.g., a threshold where the second brake system (usually) does not generate any brake force (such as the second pressure threshold discussed above, or some other value above the second pressure threshold).

In some embodiments of the method, the method may further include, iv) in response to not receiving the request for emergency braking of the vehicle within a predefined time after the determining that the request for emergency braking is imminent, iv-a) decreasing the air pressure of the first brake system again, and iv-b) increasing the air pressure of the second brake system again. Phrased differently, if the request for emergency braking does not arrive soon enough after it is determined that such a request is imminent, it may be assumed that the determination was wrong, or e.g., that the situation around/of the vehicle changed quickly enough for the potentially dangerous situation to resolve itself without having to perform emergency braking of the vehicle. As emergency braking is then no longer required, the brake systems may be "reset" to their normal operating conditions, i.e., to positions where they do not generate brake force. For example, it can be assumed that having the braking systems "armed" (i.e., closer to where they would start, or already have started to, generate brake force) causes the braking systems to wear more quickly. A "disarming" of the braking systems if the risk of danger goes down may thus avoid/reduce such wear. Herein, such "arming" of the braking systems may also be referred to as e.g., "pre-heating" or "pre-loading" of the braking systems, or similar.

In some embodiments of the method, the step i-a) of increasing the air pressure of the first brake system may include increasing the air pressure of the first brake system to a first predefined value at or below the first pressure threshold. The first predefined value may e.g., be a value where the first brake system (usually) starts (or is just about to start) generating brake force. It is envisaged that the exact value above which the first brake system starts to generate brake force may differ based on e.g., temperature and/or wetness of e.g., brake rotors or brake drums, or similar. In some embodiments, the first predefined value may be set based on expected conditions under which the vehicle is to be driven, in order to avoid the first brake system starting to generate brake force before the request for emergency braking arrives. For example, it may be studied when (i.e., at what expected air pressure), during expected normal operating conditions of the vehicle, brake force normally starts being generated by the first brake system, and the first predefined value may be set at or below this expected air pressure. In other embodiments, it may e.g., be desirable to increase the pressure of the first brake system such that it starts to generate at least some brake force before the expected request for emergency braking arrives, which may be achieved by instead setting the first predefined value above the expected air pressure at which the first brake system starts generating brake force. For example, whether to allow the first brake system to generate at least some brake force already before the request may e.g., be based upon how statistically likely it is that the imminent emergency braking request will actually happen.

In some embodiments of the method, a reasoning such as above may also be applied to the step i-b) of decreasing the pressure of the second brake system. Just as described above for the first predefined value, the air pressure of the second brake system may be decreased to a second predefined value at or above the second pressure threshold. The second predefined value may be selected such that it is at a point, or above a point, below which the second brake system (usually) starts to generate brake force, in order to avoid having the second brake system to start generating brake force before the request for emergency braking of the vehicle is received. In other embodiments, it may instead be desirable to decrease the air pressure of the second brake system such that the second brake system starts generating at least some brake force already before the request for emergency braking arrives, which may be obtained by e.g., setting the second predefined value below the expected air pressure at which the second brake system normally (under expected driving conditions of the vehicle) starts generating brake force.

In some embodiments of the method, one or both of the first predefined value and the second predefined value may e.g., be updated dynamically, taking various conditions such as brake rotor/drum temperature, brake rotor/drum wetness, etc., into account. It is also envisaged that the exact predefined values (which if updated dynamically are no longer "predefined") may be learned by the vehicle itself, e.g., by analyzing if a previously set such value was sufficient for the brake system in question to start generating brake force or not, etc.

In some embodiments of the method, as discussed above, the first brake system may be a pneumatic service brake system of the vehicle, and the second brake system may be a pneumatic parking brake system of the vehicle.

According to a second aspect of the present disclosure, a brake system controller for a (heavy) vehicle having both a pneumatic first brake system and a pneumatic second brake system is provided. The controller includes processing circuitry, and the processing circuitry is configured to cause the controller to, i) in response to obtaining an indication that a request for emergency braking of the vehicle is imminent, i-a) instruct the first brake system to increase its air pressure, such that an additional air-pressure increase needed before the first brake system starts to generate brake force is smaller than before the increase, and i-b) instruct the second brake system to decrease its air pressure, such that an additional air-pressure decrease needed before the second brake system starts to generate brake force is smaller than before the decrease. The processing circuitry is further configured to cause the controller to, ii) in response to receiving the (or a) request for emergency braking of the vehicle, ii-a) instruct the first brake system to further increase its air pressure to above a first pressure threshold above which the first brake system starts to generate brake force, and ii-b) instruct the second brake system to further decrease its air pressure to below a second pressure threshold below which the second brake system starts to generate brake force.

The controller of the second aspect is thus configured to, when controlling the first brake system and the second brake system of a vehicle, perform the method of the first aspect. As used herein, that the controller "obtains an indication that a request for emergency braking of the vehicle is imminent" may include e.g., that there is another device present and configured to analyze the various signals from sensors and/or cameras to decide whether the driver (or the vehicle) is likely to soon request the emergency braking, and that this other device may provide a signal indicating this to the controller. In other embodiments, it may be the controller itself which is responsible for receiving the signals from the sensors and/or cameras, and for deciding whether the request for emergency braking is imminent or not as part of such "obtaining an indication". As used herein, that the controller "instructs" a brake system to either increase or decrease its air pressure means that the controller is configured such that it may communicate with the respective brake system, e.g., by providing signals suitable therefore to the brake system, and such that the brake system may receive such signals and act accordingly based thereon.

In general, the division into a controller and one or more brake systems is not necessarily physical but instead only logical. It is envisaged throughout the present disclosure that e.g., the controller may also itself be part of a brake system, such as e.g., part of the first brake system or the second brake system, or similar. As mentioned earlier herein, it is envisaged that in some embodiments, the first and second brake systems may be e.g., service and parking brake systems, respectively, of the vehicle.

In some embodiments of the controller, the processing circuitry may be further configured such that it causes the controller to perform any embodiment of the method of the first aspect as described herein, e.g., by the controller thereby instructing the first brake system and second brake system to increase/decrease their air pressures accordingly.

According to a third aspect of the present disclosure, a brake system for a vehicle is provided. The system includes a pneumatic first brake system configured to start generating brake force when an air pressure of the first brake system goes above (i.e., exceeds) a first pressure threshold. This first pressure threshold may e.g., correspond to resistance/friction forces present in the first brake system, which must be overcome before any braking force is generated. The system further includes a pneumatic second brake system configured to start generating brake force when an air pressure of the second brake system goes below a second pressure threshold. As described earlier herein, this second pressure threshold may for example correspond to an air pressure needed to overcome a force provided by a coil spring of the second brake system, if the second brake system is e.g., a parking brake system of the vehicle. The system also includes a brake system controller. The brake system controller may e.g., be the controller (or any embodiment thereof) discussed above herein reference to the second aspect of the present disclosure. The braking force generated by the first brake system and/or the second brake system may e.g., be applied to stop or reduce the rotation of at least one wheel of the vehicle, or e.g., be applied on any other element used to exert force on the road, such as for example one or more tracks or similar, and/or to e.g., an axis on which such wheels and/or tracks are mounted.

In some embodiments of the brake system, the first brake system may be a pneumatic service brake system of the vehicle, and the second brake system may be a pneumatic parking brake system of the vehicle.

According to a fourth aspect of the present disclosure, a heavy vehicle is provided. The vehicle includes a brake system according to the third aspect (or any embodiment thereof) of the present disclosure. The heavy vehicle may for example be an on-road truck, an off-road truck, a dump truck, a tracked vehicle, or any vehicle which due to larger weight uses pneumatic brake systems.

According to a fifth aspect of the present disclosure, a computer program for brake management in a heavy vehicle having both a pneumatic first brake system and a pneumatic second brake system is provided. The computer program includes computer code that it, when running on processing circuitry of a brake controller of the vehicle (such as e.g. a controller according to the second aspect, or any embodiment thereof) causes the controller to, i) in response to obtaining an indication that a request for emergency braking of the vehicle is imminent, i-a) instruct the first brake system to increase its air pressure, such that an additional air-pressure increase needed before the first brake system starts to generate brake force is smaller than before the increase, and i-b) instruct the second brake system to decrease its air pressure, such that an additional air-pressure decrease needed before the second brake system starts to generate brake force is smaller than before the decrease. The processing circuitry is further configured to cause the controller to, ii) in response to receiving the (or a) request for emergency braking of the vehicle, ii-a) instruct the first brake system to further increase its air pressure to above a first pressure threshold above which the first brake system starts to generate brake force, and ii-b) instruct the second brake system to further decrease its air pressure to below a second pressure threshold below which the second brake system starts to generate brake force.

The computer program is thus configured such that it causes the controller to perform the method according to the first aspect, or any embodiments thereof as described herein. As described herein, in some embodiments, the first brake system may e.g., be a pneumatic service brake system of the vehicle, and the second brake system may e.g., be a pneumatic parking brake system of the vehicle.

In some embodiments of the computer program, the computer code is further such that it, when running on the processing circuitry of the controller, causes the controller to perform any embodiment of the method of the first aspect as described herein.

According to a sixth aspect of the present disclosure, a computer program product is provided. The computer program product includes a computer program as described above according to the fifth aspect (or any embodiments thereof). The computer program product further includes a computer-readable storage medium, on which the computer program is stored. In some embodiments of the computer program product, the storage medium may be non-transitory.

Other objects and advantages of the present disclosure will be apparent from the following detailed description, the drawings and the claims. Within the scope of the present disclosure, it is envisaged that all features and advantages described with reference to e.g. the method of the first aspect are relevant for, apply to, and may be used in combination with also any feature and advantage described with reference to the controller of the second aspect, brake system of the third aspect, the vehicle of the fourth aspect, the computer program of the fifth aspect, and the computer program product of the sixth aspect, and vice versa.

BRIEF DESCRIPTION OF THE DRAWINGS

Exemplifying embodiments will now be described below with reference to the accompanying drawings, in which.

Figure 1A:
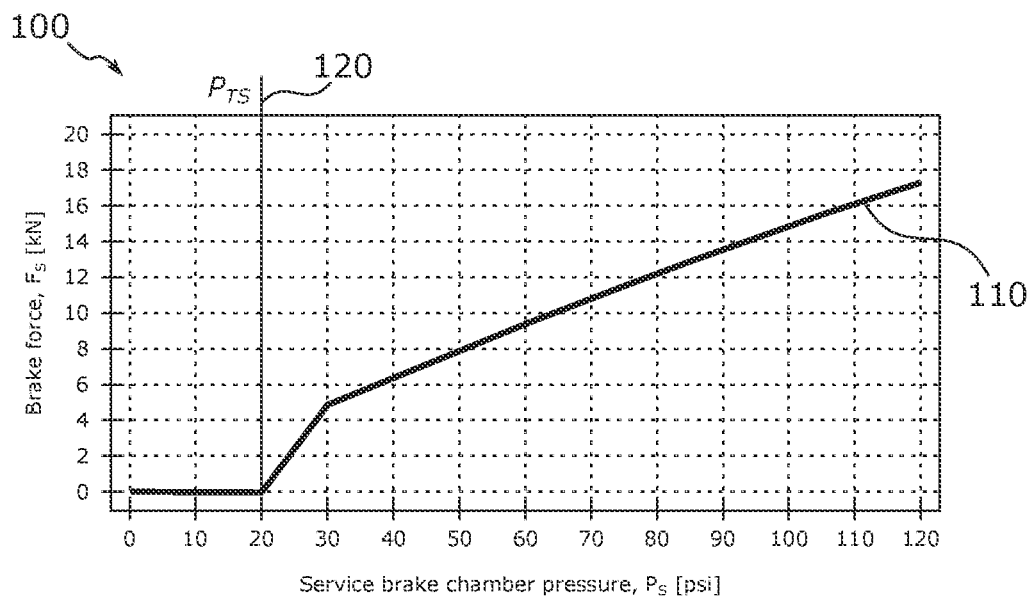
FIGS. 1A and 1B schematically illustrate how the brake forces generated by service and parking brake systems generally depend on applied air pressure.

In the drawings, like reference numerals will be used for like elements unless stated otherwise. Unless explicitly stated to the contrary, the drawings show only such elements that are necessary to illustrate the example embodiments, while other elements, in the interest of clarity, may be omitted or merely suggested. As illustrated in the Figures, the (absolute or relative) sizes of elements and regions may be exaggerated or understated vis-à-vis their true values for illustrative purposes and, thus, are provided to illustrate the general structures of the embodiments.

DETAILED DESCRIPTION

The present disclosure proposes to utilize that a vehicle may have both a pneumatic first brake system which is activated by increasing its air pressure and a second pneumatic brake system which is instead activated by decreasing its air pressure. In what follows, a pneumatic service brake system will be used to illustrate an example of such a first brake system, while a pneumatic parking brake system will be used to illustrate an example of such a second brake system. It is however envisaged herein that there may also be other types of brake systems which also fulfill the same properties, and that those may be used instead of one or both of the service and parking brake systems. In what follows, the terms "air pressure" and simply "pressure" will be used interchangeably, and it is assumed that any change of pressure of a particular brake system refers to a change of an air pressure of the particular brake system.

The functioning of pneumatic service and parking brakes in a heavy vehicle, such as in e.g., a truck, will now be described in more detail with reference to FIGS. 1A and 1B.

Both parking and service brake systems in heavy vehicles (such as trucks) are often operated using air pressure, i.e., they are "pneumatic" or "pneumatically operated". In the service brake system, brake force is often generated by using air pressure to squeeze brake pads against a rotor (in case of disc brakes), and/or to e.g., push brake shoes against a drum (in case of drum brakes). When no air pressure is applied, there is no brake force generated by the service brake system. As the various components of a service brake system introduce resistance/friction forces, there is also a minimum air pressure which must be applied before the friction in the system is overcome, and before any brake force is generated.

FIG. 1A presents a plot 100 of an exemplary relationship between generated brake force ($F_S$, vertical axis) and brake chamber pressure ($P_S$, horizontal axis) in a typical service brake system, as illustrated by the curve 110. From the plot 100, it can be understood that in order to generate any brake force, the chamber pressure $P_S$ must exceed a finite first pressure threshold $P_{TS}$, as illustrated by the vertical line 120. In the example provided in FIG. 1A, this first pressure threshold $P_{TS}$ is approximately 20 psi, but may of course vary between different service brake systems. It is assumed that the first pressure threshold $P_{TS}$ may be found e.g., by routine experiments and/or from the specifications of the service brake system. It is also assumed that $P_{TS}$ may change with varying brake rotor/drum temperature and/or wetness, etc., and that the dependency of $P_{TS}$ on such factors can also be studied experimentally and/or theoretically. However, for the sake of argument, it will be assumed that $P_{TS}$ remains fixed and equals 20 psi. Once the chamber pressure $P_S$ goes above $P_{TS}$, brake force $F_S$ is thus generated and increases with increasing chamber pressure $P_S$.

As mentioned earlier herein, if the chamber pressure is zero or below $P_{TS}$ in the event of an emergency occurring, the need to overcome the friction in the service brake system thereby introduces a delay between e.g. pressing on the brake pedal and brake force being generated, as sufficient pressure $P_S$ must first be built up in the service brake system to reach the first pressure threshold $P_{TS}$.

To complement the service brake system, trucks and other heavy vehicles are often provided also with parking brakes in the form of spring brakes. The parking brake system operates in an opposite way to that of the service brake system, in that in order for the parking brake system to engage, the chamber pressure of the parking brake system must be reduced instead of increased. A coil spring is for example used (when released) to push the brake pads and/or shoes against their corresponding brake rotor/drum. In order to disengage the parking brakes, the coil spring must be compressed using air pressure. This provides additional safety, as brake force is thus generated also in case of an overall pressure drop/loss in the brake system of the vehicle, and the parking brake force is sufficient to compensate for at least some of the brake force lost due to the service brake system having lost its pressure. Parking brakes may therefore also serve as emergency brakes. In some configurations, service and parking brakes may be integrated together in a same unit. For the purpose of the present disclosure, the exact configurations of the parking and service brake systems are not relevant, as long as the service brake system is engaged by increasing air pressure in the system, and while the parking brake system is engaged by instead decreasing air pressure in the system.

Figure 1B:
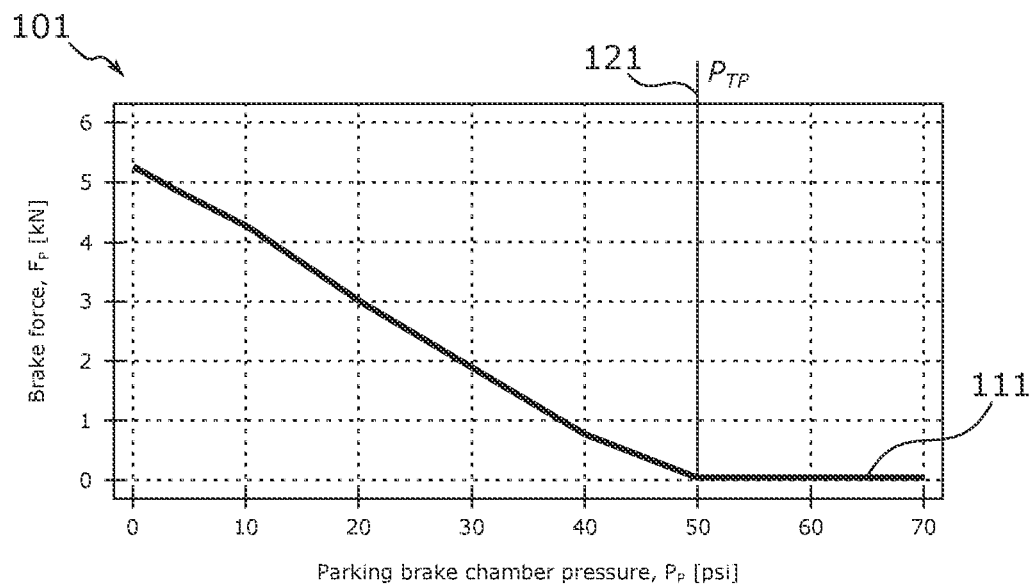

FIG. 1B presents a plot 101 of an exemplary relationship between generated brake force ($F_p$, vertical axis) and brake chamber pressure ($P_p$, horizontal axis) in a typical parking brake system, as illustrated by the curve 111. From the plot 101, it can be seen that in order to generate any brake force, the chamber pressure of the parking brake system must be below a finite second pressure threshold $P_{TP}$), as illustrated by the vertical line 121, in order to sufficiently compress the coil spring(s). In the example provided in FIG. 1B, this second pressure threshold $P_{TP}$ is approximately 50 psi, but may of course vary between different parking brake systems. It is assumed that also the second pressure threshold $P_{TP}$ may be found e.g., by routine experiments and/or theoretical calculations. It is assumed that $P_{TP}$ may also change with varying brake rotor/drum temperature and/or wetness, etc., and that the dependency of $P_{TP}$ on such factors can also be studied experimentally and/or theoretically. However, for the sake of argument, it will be assumed that $P_{TP}$ remains fixed and equals 50 psi. Once the chamber pressure $P_p$ goes below $P_{TP}$, brake force $F_p$ is thus generated and increases with decreasing chamber pressure $P_p$.

How the present disclosure provides a solution for at least partly overcoming the problem with the delay introduced by the friction in the service brake system will now be described in more detail with reference to FIGS. 2A, 2B, 3, 4A, 4B and 5. These figures show exemplifying embodiments of the envisaged improved method, brake system controller, and brake system, and also serve to illustrate the concepts of an envisaged (heavy) vehicle, computer program and computer program product as also envisaged herein. The drawings show currently preferred embodiments, but the invention may, however, be embodied in many different forms and should not be construed as limited to the embodiments set forth herein; rather, these embodiments are provided for thoroughness and completeness, and fully convey the scope of the present disclosure to the skilled person.

Various embodiments of an envisaged improved method will now be described with reference to FIGS. 2A and 2B.

Figure 2A:
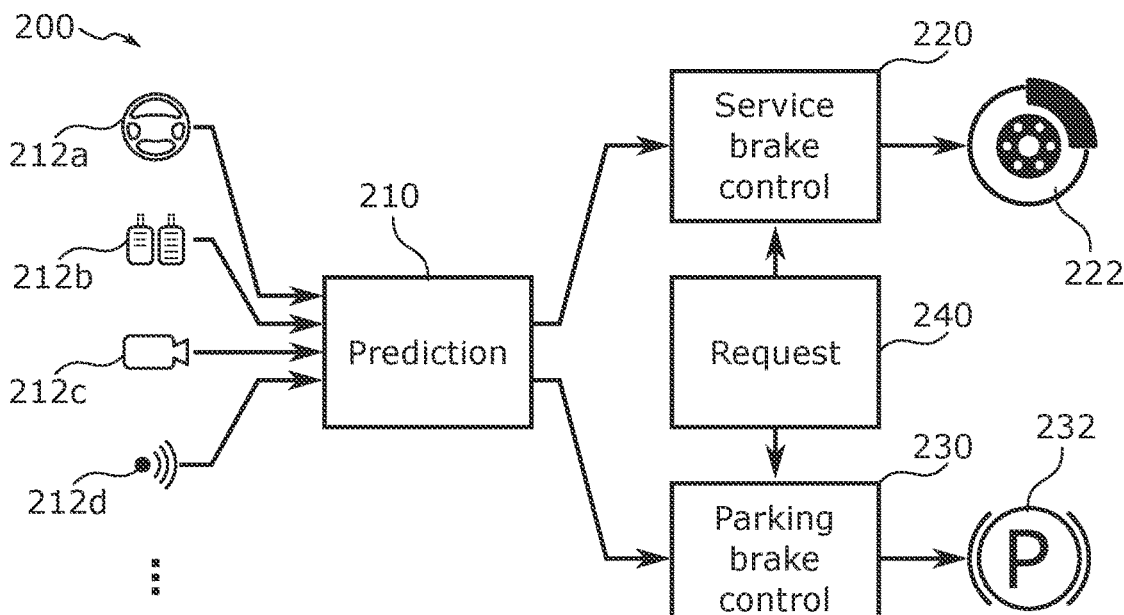
FIGS. 2A and 2B schematically illustrate flows of various embodiments of a method of braking management according to the present disclosure.
Figure 2B:
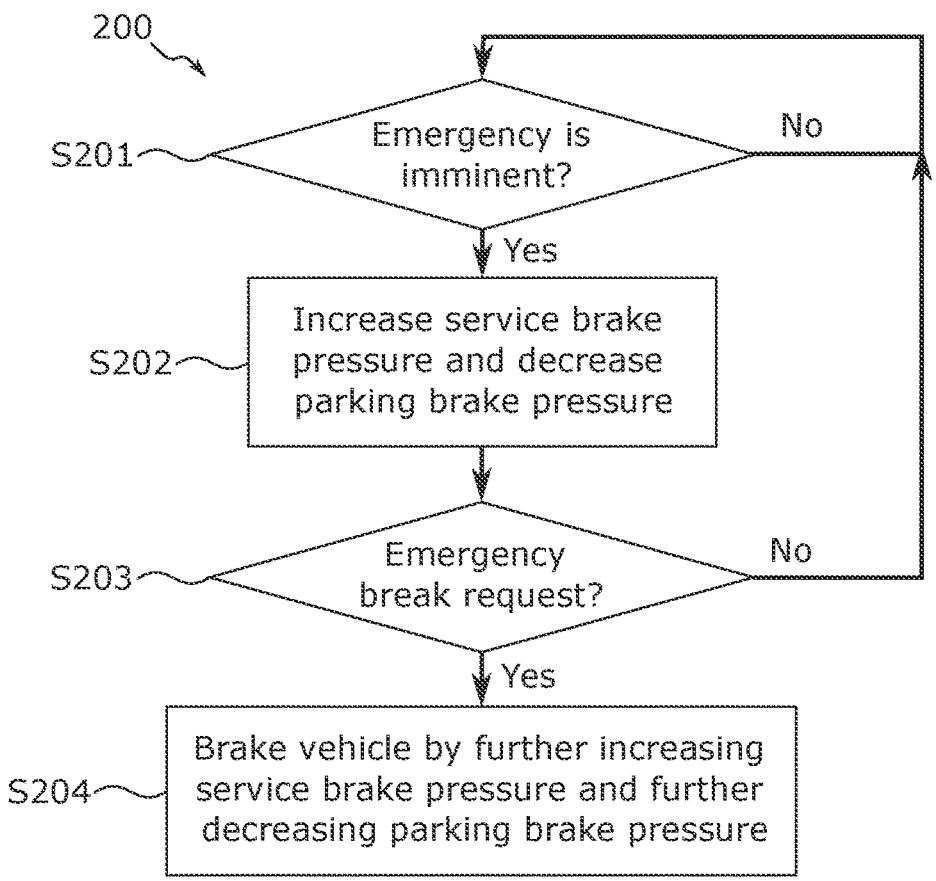

FIG. 2A schematically illustrates the flow of a method 200 using various functional units, while FIG. 2B schematically illustrates various steps of the method as implemented and performed by such functional units.

A prediction unit 210 receives input from one or more sensors of the vehicle. Such sensors may e.g., include, or at least be configured to provide information about a current state of, a steering wheel 212a of the vehicle, one or more pedals 212b of the vehicle, one or more cameras 212c of the vehicle, one or more radars 212d of the vehicle, and so on. For example, information about the steering wheel 212a may include the current steering angle, how tightly the driver is gripping the steering wheel, whether the driver is pulling or pushing on the steering wheel, etc. Information about the one or more pedals 212b may for example indicate whether the driver is currently pushing on one or more of the pedals (such as e.g., a brake pedal and/or throttle pedal), how strongly the driver is pushing on a pedal, exactly on which pedals the driver is pushing, etc. The one or more cameras 212c may e.g., include cameras monitoring the road ahead of the vehicle (to e.g., detect objects in front of the vehicle for which the vehicle should eventually brake if the objects do not move). Other examples of cameras include e.g., cameras facing the driver, in order to monitor e.g., a health state of the driver, a behavior of the driver, an alertness/focus level of the driver, or similar. Cameras may also be positioned to e.g., track how the driver moves his limbs, e.g., to turn the steering wheel 212a and/or to push on one or more of the pedals 212b. The radar units 212d may e.g., be one or more units for detecting a distance to other vehicles or objects in front of the vehicle, e.g., as used in modern cruise controls, in systems for automatic braking, and/or in similar such systems.

In a step S201, the prediction unit 210 determines whether a request for emergency braking of the vehicle is imminent, based on information from/about the various objects 212a-d. If it is determined that such an emergency braking request is imminent, the prediction unit 210 communicates this to a service brake control unit 220 and to a parking brake control unit 230. The unit 220 is configured to control a service brake system 222, and is envisaged as including the means necessary to e.g., increase and decrease an air pressure of the service brake system 222. The unit 230 is similarly configured to control a parking brake system 232, and is envisaged as including the means necessary to e.g., increase and decrease an air pressure of the parking brake system 232. For example, such "means" may include an arrangement of one or more air compressors, control valves, air ducts or hoses, air pressure reservoirs, etc., needed to obtain the desired functionality. Although illustrated in FIG. 2A as separate units, the units 220 and 230 may of course also be integrated in a same unit, as e.g., a same compressor and/or air pressure reservoir may be used to provide air to both the service brake system 222 and the parking brake system 232. As mentioned before, both the service brake system 222 and the parking brake system 232 may in some embodiments also be integrated in a same unit.

In a step S202, in response to receiving information from the prediction unit 210 that an emergency braking request is imminent, the control units 220 and 230 are configured such that the service brake control unit 220 increases an air pressure in the service brake system 222, such that an additional air-pressure increase needed before the service brake system 222 starts to generate brake force is smaller than before such an increase. Similarly, the parking brake control unit 230 decreases an air pressure in the parking brake system 232, such that an additional air-pressure decrease needed before the parking brake system 232 starts to generate brake force is also smaller than before such a decrease. Thus, once it is determined that an emergency braking request is imminent (that is, once it is determined that such an emergency braking request is, in a near future, sufficiently likely to occur), the method 200 includes pro-actively pre-heating/pre-loading/arming/etc. the brake systems 222 and 232 already before the actual emergency braking request is received.

A request unit 240 is configured to determine whether there is an actual emergency braking of the vehicle requested. As described earlier herein, this may be achieved e.g., by the request unit 240 having access to (information about) e.g., one or more of the various sensors/objects 212a-212d or similar. For example, the request unit 240 may e.g., be configured to receive a signal when the driver presses sufficiently hard on the pedals 212b (such as on a brake pedal), or similar, or e.g., to receive some other signal indicating that the emergency braking of the vehicle is now required. In other embodiments, the request unit 240 may be less complex, and instead e.g., be configured to receive a signal (not shown) explicitly telling the request unit 240 that the emergency brake is requested.

In a step S203, the request unit 240 thus determines whether such an emergency braking request is received or not (either by its own analysis, or by receiving a signal explicitly telling it so). If it is determined that the emergency brake request is received, in a step S204, the request unit 240 then communicates this to the control units 220 and 230. The control unit 220 causes a further increase of the air pressure in the service brake system 222, while the control unit 230 causes a further decrease of the air pressure in the parking brake system 232. In particular, the air-pressure increase of the service brake system 222 is sufficient to cause the air pressure in the service brake system 222 to exceed the first pressure threshold $P_{TS}$ such that the service brake system 222 starts to generate brake force. Similarly, the air-pressure decrease of the parking brake system 232 is sufficient to cause the air pressure in the parking brake system 232 to go below the second pressure threshold $P_{TP}$ such that the parking brake system 232 also starts to generate brake force. As a consequence, the emergency braking of the vehicle is started by compounding the brake forces generated by both the service brake system 222 and the parking brake system 232.

In the case that the prediction unit 210 instead determines that no emergency braking request is currently imminent, the method 200 may loop back to step S201, and the prediction unit 210 may continue to check whether such an emergency braking request is imminent. Likewise, if the request unit 240 does not determine that an emergency braking request is received, the method 200 may loop back to e.g., step S201 again.

In some embodiments of the method 200, it is envisaged that step S203 includes measuring a time elapsed since determining (in step S201) that the emergency braking request is imminent. If the emergency braking request is not received before the elapsed time reaches a certain maximum value (i.e., within a predefined time after the determining that the emergency braking request is imminent), the method 200 may proceed with "undoing" step S202 by decreasing the air pressure of the service brake system 222 and by increasing the air pressure of the parking brake system 232 again. For example, if using FIGS. 1A and 1B for illustration, such a decision may include e.g., to decrease the air pressure of the service brake system 222 back to approximately zero psi (or at least below 20 psi), and to increase the air pressure of the parking brake system 232 back to e.g., 50 psi again (or even further above 50 psi). Not receiving the emergency braking request within such a predefined time interval may e.g., indicate that the initial guess about the imminence of the emergency braking request was wrong, or that the situation around the vehicle has changed such that an imminent emergency is no longer likely.

A time evolution of an embodiment of the method 200 as envisaged herein will now be further described in more detail with reference also to FIG. 3.

Figure 3:
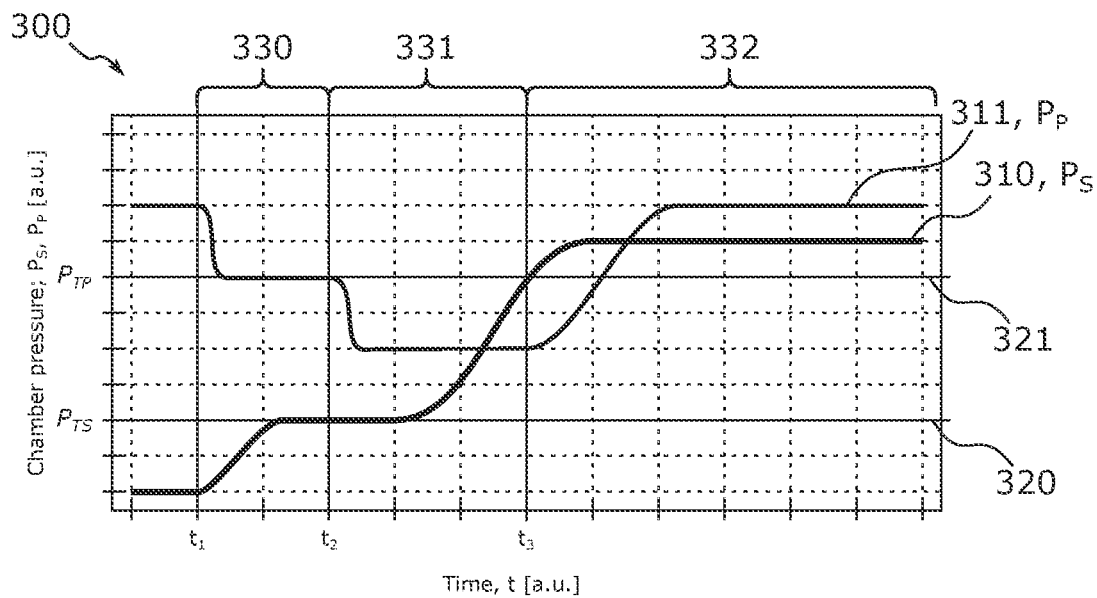
FIG. 3 schematically illustrate how, when performing the envisaged method(s) of the present disclosure, the chamber air pressures of the parking and service brake systems change with time.

FIG. 3 schematically illustrate how the chamber air pressures $P_S$ and $P_p$ of the service and parking brake systems change with time t, as shown by the curves 310 and 311 respectively. The horizontal axis corresponds to time (in arbitrary units, "a.u."), while the vertical axis corresponds to pressure (also in arbitrary units).

Before a time $t_1$, both the service and parking brakes are in their "normal" states and are not active. For example, if using FIGS. 1A and 1B as exemplary illustrations, this may correspond to the pressure $P_S$ being below (or even well below) 20 psi, and the pressure $P_p$ being above (or even well above) e.g., 50 psi. At time $t_1$, it is determined (by e.g. the prediction unit 210) that a request for emergency braking of the vehicle is imminent (i.e. likely to occur anytime soon), and the method 200 proceeds by increasing the pressure of the service brake system 222 towards the first pressure threshold $P_{TS}$, as indicated by the horizontal line 320, and by decreasing the pressure of the parking brake system 232 towards the second pressure threshold $P_{TP}$, as indicated by the horizontal line 321. After having reached the respective pressure thresholds $P_{TS}$ and $P_{TP}$, the pressures $P_S$ and $P_p$ are held constant such that each brake system is just about, but have not yet started, to generate brake force. The brake systems 222 and 232 are thus "armed".

At a later time $t_2$, the request for the emergency braking of the vehicle is actually received, and the method 200 proceeds with further increasing the pressure $P_S$ and further decreasing the pressure $P_T$, such that both braking systems 222 and 232 now starts to generate brake force in a compound fashion. As can be seen in FIG. 3, decreasing the air pressure in the parking brake system 232 is quicker than increasing the air pressure in the service brake system 222, and the parking brake system 232 thus starts to generate brake force before the service brake system 222. Phrased differently, immediately following time $t_2$, it is envisaged that it is the parking brake system 232 which provides most of the brake force during the compound emergency braking of the vehicle. After a while, however, the pressure $P_S$ will have reached sufficient levels for the service brake system 222 to take over the main responsibility of the emergency braking of the vehicle, as the potential brake force generated by the service brake system 222 is assumed to be substantially larger than that of the parking brake system 232 once the pressure $P_S$ becomes sufficiently high. It may for example be envisaged that this occurs at a time $t_3$ following $t_2$.

At time $t_3$, the service brake system 222 performs most of the emergency braking of the vehicle, and the pressure $P_p$ of the parking brake system 232 is (in some embodiments of the method 200) thus increased again in order not to e.g. overheat the parking brake system 232 (which is usually designed only to keep the vehicle at a standstill or to brake the vehicle at low speeds, and where long-term compounding of both the service and parking brake systems may cause wear and/or damage due to the resulting forces). Consequently, after some time after $t_3$, the pressure $P_p$ is increased back to e.g., above 50 psi or higher again and then kept e.g., constant around this pressure level. Meanwhile, the pressure $P_S$ is still kept high and above $P_{TS}$, such that the emergency braking of the vehicle is still continued. Once the vehicle has come to a halt, or at least has its speed sufficiently reduced to avoid e.g., a potential accident, the pressure $P_S$ may be reduced back to e.g., below 20 psi or similar to deactivate the service brake system 222. This is not shown in FIG. 3, but may be envisaged as occurring at some point in time following e.g., $t_3$.

As described earlier herein, the arming of the service brake system 222 before $t_2$ helps to decrease (or even completely remove) the remaining pressure-increase of $P_S$ needed before the service brake system 222 can start generating brake force once the emergency braking request arrives. This in itself helps to reduce the stopping distance of the vehicle, as the delay caused by having to wait for a sufficient pressure-buildup in the service brake system 222 is reduced or even eliminated completely.

As also described earlier herein, by also arming and then using the parking brake system 232 to provide at least some brake force before (between $t_2$ and $t_3$) the service brake system 222 is able to provide most of the brake force, the stopping distance may be further reduced, and consequently also the risk of the vehicle being involved in an accident. This because the parking brake system 232 is configured to activate in response to a decrease in pressure instead of an increase in pressure, and because a decrease in pressure is often faster to achieve than an increase in pressure.

In summary of the method as proposed herein, the proactive arming of the brake systems 222 and 232 already when predicting/determining that an emergency braking request is imminent (i.e., likely), together with the proposed compounding of both the service and parking brake systems 222 and 232 once the emergency braking request is actually received, thus helps to provide an improved brake management in vehicles and a safer and more efficient emergency braking.

Various embodiments of a brake system controller for a heavy vehicle as envisaged herein will now be described in more detail with reference also to FIGS. 4A and 4B.

Figure 4A:
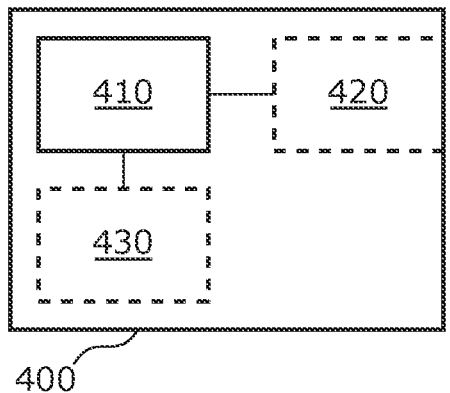
FIGS. 4A and 4B schematically illustrates various embodiments of a brake system controller according to the present disclosure, and FIG. 5 schematically illustrates an embodiment of a brake system for a heavy vehicle according to the present disclosure.

FIG. 4A schematically illustrates, in terms of a number of functional units, the components of an embodiment of a brake system controller 400 (herein referred to as simply a "controller"). The controller 400 is for a heavy vehicle having both first and second brake systems as discussed herein, e.g., a service brake system and a parking brake system. The controller 400 includes processing circuitry 410. The processing circuitry 410 is provided using any combination of one or more of a suitable central processing unit (CPU), multiprocessor, microcontroller, digital signal processor (DSP), etc., capable of executing software instructions stored in a computer program product (not shown, but envisaged herein) stored on a storage medium 430. The processing circuitry 410 may further be provided as at least one application specific integrated circuit (ASIC), or field-programmable gate array (FPGA), or similar.

Particularly, the processing circuitry 410 is configured to cause the controller 400 to perform a set of operations, or steps, such as one or more of steps S201-S204 as disclosed above e.g., when describing the method 200 illustrated in FIG. 2B. For example, the storage medium 430 may store a set of operations, and the processing circuitry 410 may be configured to retrieve the set of operations from the storage medium 430 to cause the controller 400 to perform the set of operations. The set of operations may be provided as a set of executable instructions. Thus, the processing circuitry 410 is thereby arranged to execute methods as disclosed herein e.g., with reference to FIGS. 2A, 2B and/or 3.

The storage medium 430 may also include persistent storage, which, for example, can be any single or combination of magnetic memory, optical memory, solid state memory or even remotely mounted memory. The storage medium 430 may thus provide non-transitory storage, storing computer-readable instructions for the processing circuitry 410.

The controller 400 may further include a communications interface 420 for communications with other entities and objects, such as e.g., the objects/sensors 212a-d shown in FIG. 2A, and/or for communications with one or more brake system control units such as e.g., the units 220 and 230. As such, the communication interface 420 may include one or more transmitters and receivers, including analogue and/or digital components, and may utilize e.g., one or more wired and/or wireless connections for this purpose.

The processing circuitry 410 controls the general operation of the controller 400 e.g., by sending data and control signals to the communications interface 420 and the storage medium 430, by receiving data and reports from the communications interface 420, and by retrieving data and instructions from the storage medium 430. Other components, as well as their related functionality, of the controller 400 are omitted in order not to obscure the concepts presented herein.

Figure 4B:
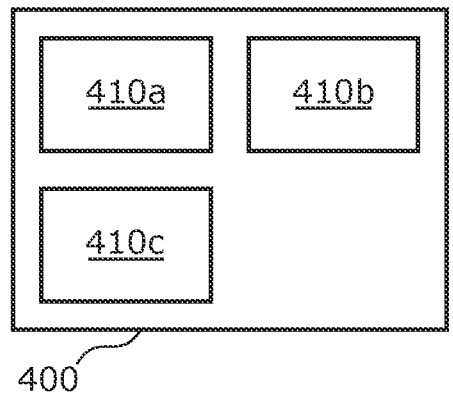

FIG. 4B schematically illustrates, in terms of a number of functional modules 410a-c, the components of a controller 400 according to one or more embodiments of the present disclosure. The controller 400 includes at least a predict/determine module 410a configured to perform step S201 of the method 200 described with reference to e.g., FIGS. 2A, 2B and 3, and a request module 410b configured to perform step S203 of the method 200. The controller 400 also includes an instruct module 410c configured to e.g., perform the steps S202 and S204 of the method 200, by instructing e.g., the various service and parking brake systems 222 and 232 to increase/decrease their air pressures as needed. The functionality of the predict/determine module 410a may e.g., correspond to that of the prediction unit 210 shown in FIG. 2A. The functionality of the request module 410b may e.g., correspond to that of the request module 240, while the functionality of the instruct module 410c may e.g., correspond to those of the service and parking brake control units 220 and 222.

In general terms, each functional module 410a-c may be implemented in hardware or in software. Preferably, one or more or all functional modules 410a-c may be implemented by the processing circuitry 410, possibly in cooperation with the communications interface 420 and/or the storage medium 430. The processing circuitry 410 may thus be arranged to from the storage medium 430 fetch instructions as provided by a functional modules 410a-c, and to execute these instructions and thereby perform any steps of the method 200 performed by the controller 400 as disclosed herein.

In some embodiments, the controller 400 may further include additional functional modules (not shown) required to perform also other steps of the method 200 as envisaged and described herein. For example, the method 200 may include a step in which, after or while performing the emergency braking of the vehicle, the air pressure of the parking brake system is increased to above $P_{TP}$ again, and the controller 400 may have a corresponding functional module configured to implement this step. For example, the method 200 may include a step in which, in response to not receiving the request for emergency braking of the vehicle within a predefined time after determining (or guessing) that such a request is imminent, decreasing and increasing the air pressures of the service and parking brake systems, respectively, again, and the controller 400 may have a corresponding functional module configured to implement such a step.

In some embodiments, the method 200 may be such that the step of arming the service brake system 222 may include increasing the air pressure of the service brake system 222 to a first predefined value at or below the first pressure threshold $P_{TS}$, as e.g. illustrated in FIG. 3 where this first predefined value is the first pressure threshold $P_{TS}$, and the instruct module 410c may be configured to provide such functionality. In some embodiments of the method 200, the step of arming the parking brake system 232 may include decreasing the air pressure of the parking brake system 232 to a second predefined value at or above the second pressure threshold $P_{TP}$ (where in FIG. 3 this second predefined value is the second pressure threshold $P_{TP}$), and the instruct module 410c may be configured provide such functionality. In summary, the controller 400 may be configured such that it, in combination with the corresponding sensors/objects needed to determine the imminence of the emergency braking request, and the arrival of the actual emergency braking request, and also in combination with the various brake systems, is configured to perform any embodiments and steps of methods 200 as described and envisaged herein.

The present disclosure also envisages to provide a brake system for a heavy vehicle, as will now be described in more detail with reference also to FIG. 5.

Figure 5:
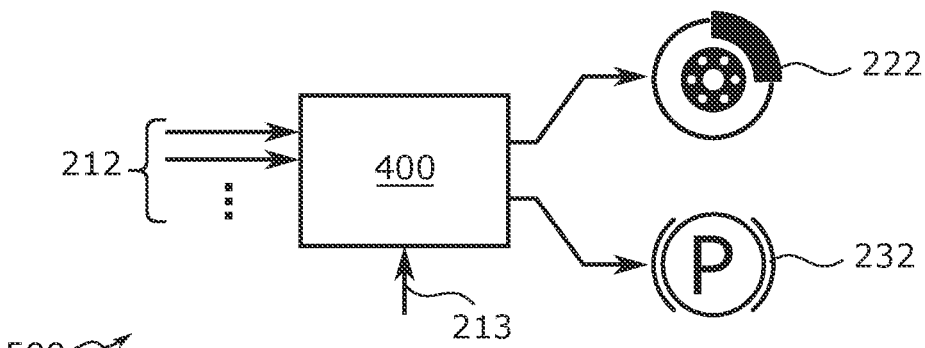

FIG. 5 schematically illustrates a brake system 500 (hereinafter referred to as simply the "system"). The system 500 includes a pneumatic service brake system 222 and a pneumatic parking brake system 232, both as described earlier herein and serving as examples of a first and second brake system, respectively. The system 500 further includes a brake system controller 400 as also described earlier herein. The brake system controller 400 is configured to receive one or more signals 212, from e.g., sensors/objects 212a-d or similar, such that the controller 400 may determine that a request for emergency braking of the vehicle is imminent (i.e., likely), and to also determine that an actual request for such emergency braking arrives/occurs. If not being able (or configured) to determine that the request for emergency braking is made using only the one or more signals 212, the controller 400 can optionally be provided to receive a signal 213 which explicitly tells the controller 400 that there is now a request for an emergency braking of the vehicle. The signal 213 may e.g., be provided by another unit configured to determine that an emergency braking of the vehicle is needed, e.g., a unit already forming part of a driver assistance or other safety system of the vehicle. The brake system 500 is thus configured such that it allows a method 200 as described an envisaged herein to be perform, in order to manage the braking of the vehicle to provide a shorter stopping distance and an enhanced safety.

The present disclosure also envisages to provide a heavy vehicle (not shown), which includes a brake system such as the brake system 500 just described with reference to FIG. 5.

The present disclosure also envisages to provide a computer program for brake management in a heavy vehicle having both a pneumatic service brake system and a pneumatic parking brake system (i.e., a pneumatic first brake system and a pneumatic second brake system, respectively), where such systems are as already described herein. The computer program includes computer code that, when running on a processing circuitry of a brake controller of the vehicle (such as e.g., the processing circuitry 410 of the controller 400 described with reference to FIGS. 4A and 4B), causes the controller to perform the various steps of any method 200 as described and envisaged herein.

The present disclosure also envisages a computer program product (not shown) in which the above envisaged computer program is stored or distributed on a data carrier. As used herein, a "data carrier" may be a transitory data carrier, such as modulated electromagnetic or optical waves, or a non-transitory data carrier. Non-transitory data carriers include volatile and non-volatile memories, such as permanent and non-permanent storage media of magnetic, optical or solid-state type. Still within the scope of "data carrier", such memories may be fixedly mounted or portable.

Although features and elements may be described above in particular combinations, each feature or element may be used alone without the other features and elements or in various combinations with or without other features and elements. Additionally, variations to the disclosed embodiments may be understood and effected by the skilled person in practicing the claimed invention, from a study of the drawings, the disclosure, and the appended claims.

In the claims, the words "comprising" and "including" does not exclude other elements, and the indefinite article "a" or "an" does not exclude a plurality. The mere fact that certain features are recited in mutually different dependent claims does not indicate that a combination of these features cannot be used to advantage.

The invention claimed is:

1. A method of brake management in a heavy vehicle having a pneumatic first brake system and a pneumatic second brake system, wherein the first brake system is configured to start generating brake force when an air pressure of the first brake system goes above a first pressure threshold and wherein the second brake system is configured to start generating brake force when an air pressure of the second brake system goes below a second pressure threshold, the method comprising:
  in response to determining that a request for emergency braking of the heavy vehicle is imminent:
    increasing the air pressure of the first brake system, such that an additional air pressure increase needed before the first brake system starts to generate brake force is smaller than before the increasing; and decreasing the air pressure of the second brake system, such that an additional air pressure decrease needed before the second brake system starts to generate brake force is smaller than before the decreasing;

in response to receiving the request for emergency braking of the heavy vehicle, performing an emergency braking of the heavy vehicle by compounding both the first and the second brake systems, including:

further increasing the air pressure of the first brake system to above the first pressure threshold; and further decreasing the air pressure of the second brake system to below the second pressure threshold; and after receiving the request for emergency braking of the heavy vehicle and while still performing the emergency braking of the heavy vehicle using the first brake system, increasing the air pressure of the second brake system to above the second pressure threshold again.

2. The method of claim 1, further comprising:

in response to not receiving the request for emergency braking of the heavy vehicle within a predefined time after the determining that the request for emergency braking of the heavy vehicle is imminent:

decreasing the air pressure of the first brake system again; and increasing the air pressure of the second brake system again.

3. The method of claim 1, wherein the increasing the air pressure of the first brake system comprises increasing the air pressure of the first brake system to a first predefined value at or below the first pressure threshold.

4. The method of claim 1, wherein the decreasing the air pressure of the second brake system comprises decreasing the air pressure of the second brake system to a second predefined value at or above the second pressure threshold.

5. The method of claim 1, wherein the first brake system is a pneumatic service brake system of the heavy vehicle, and wherein the second brake system is a pneumatic parking brake system of the heavy vehicle.

6. A brake system controller for a heavy vehicle having both a pneumatic first brake system and a pneumatic second brake system, the controller comprising processing circuitry configured to cause the brake system controller to:

in response to obtaining an indication that a request for emergency braking of the heavy vehicle is imminent:

instruct the first brake system to increase an air pressure in the first brake system, such that an additional air pressure increase needed before the first brake system starts to generate brake force is smaller than before the increase;

instruct the second brake system to decrease an air pressure in the second brake system, such that an additional air pressure decrease needed before the second brake system starts to generate brake force is smaller than before the decrease;

in response to receiving the request for emergency braking of the vehicle:

instruct the first brake system to further increase the air pressure to above a first pressure threshold above which the first brake system starts to generate brake force; and instruct the second brake system to further decrease the air pressure to below a second pressure threshold below which the second brake system starts to generate brake force; and after receiving the request for emergency braking of the vehicle and while still performing the emergency braking of the heavy vehicle using the first brake system, increase the air pressure of the second brake system to above the second pressure threshold again.

7. The controller of claim 6, wherein the processing circuitry is further configured to cause the brake system controller, by further instructing the first brake system and the second brake system, to:

in response to not receiving the request for emergency braking of the heavy vehicle within a predefined time after the determining that the request for emergency braking of the vehicle is imminent:

decreasing the air pressure of the first brake system again; and increasing the air pressure of the second brake system again.

8. A brake system for a heavy vehicle, comprising:

the brake system controller of claim 6;

a pneumatic first brake system configured to start generating brake force when the air pressure of the first brake system goes above the first pressure threshold; and a pneumatic second brake system configured to start generating brake force when the air pressure of the second brake system goes below the second pressure threshold.

9. The brake system of claim 8, wherein the first brake system is a pneumatic service brake system and the second brake system is a pneumatic parking brake system.

10. A heavy vehicle, comprising the brake system of claim 8.

11. A computer program product for brake management in a heavy vehicle having both a pneumatic first brake system and a pneumatic second brake system, the computer program product comprising a non-transitory computer readable medium having stored thereon a computer program that, when run on processing circuitry of a brake system controller of the heavy vehicle, causes the brake system controller to:

in response to obtaining an indication that a request for emergency braking of the heavy vehicle is imminent:

instruct the first brake system to increase an air pressure in the first brake system, such that an additional air pressure increase needed before the first brake system starts to generate brake force is smaller than before the increase;

instruct the second brake system to decrease an air pressure in the second brake system, such that an additional air pressure decrease needed before the second brake system starts to generate brake force is smaller than before the decrease; in response to receiving the request for emergency braking of the vehicle:

instruct the first brake system to further increase the air pressure to above a first pressure threshold above which the first brake system starts to generate brake force; and instruct the second brake system to further decrease the air pressure to below a second pressure threshold below which the second brake system starts to generate brake force; and after receiving the request for emergency braking of the heavy vehicle and while still performing the braking of the heavy vehicle using the first brake system, increase the air pressure of the second brake system to above the second pressure threshold again.

\* \* \* \* \*